Figure 6:
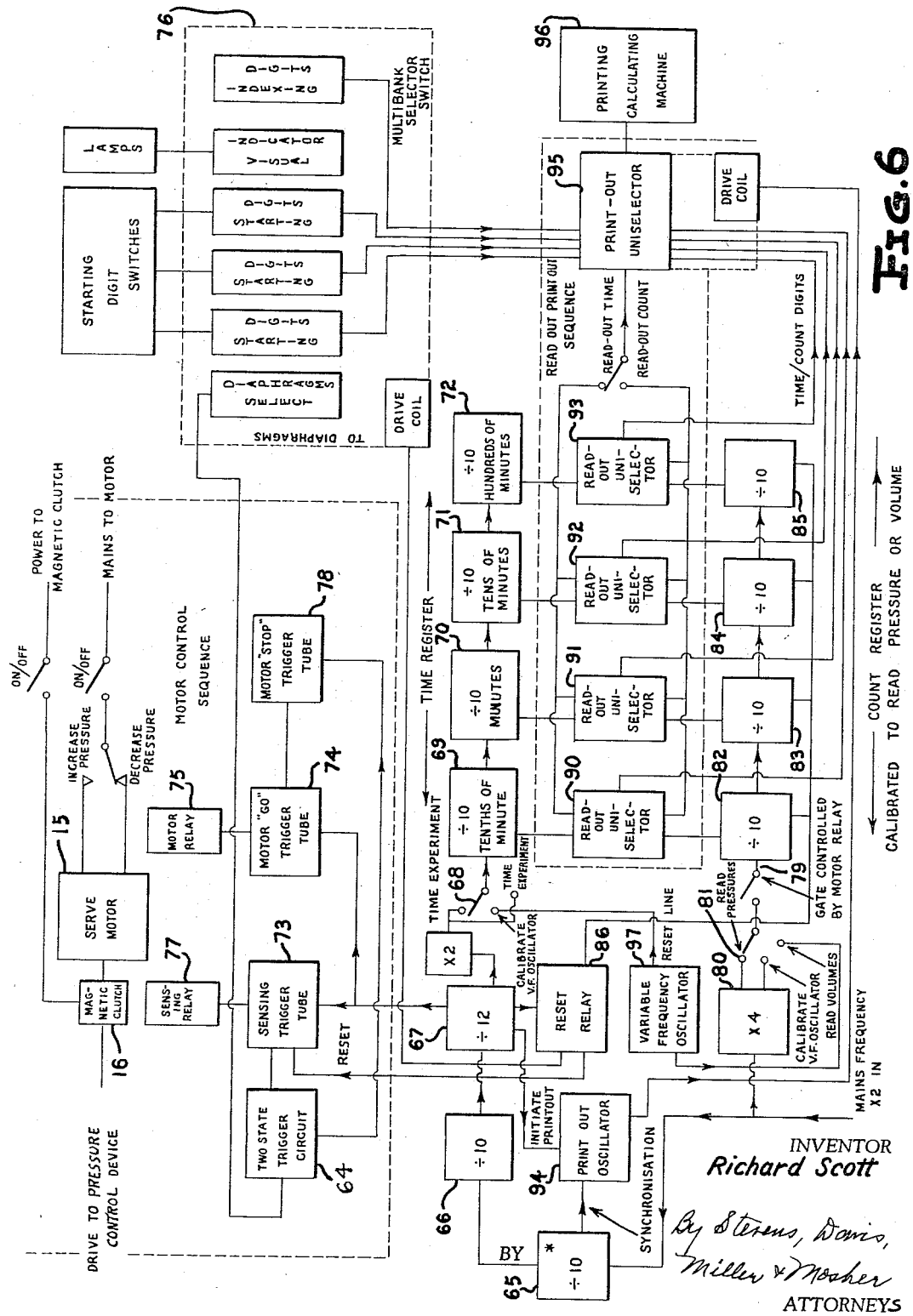

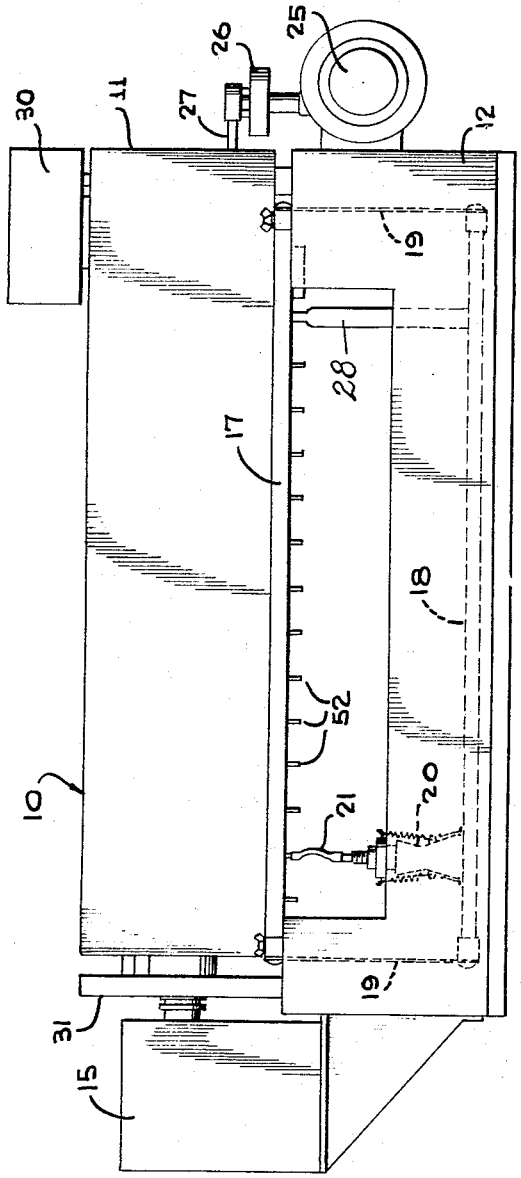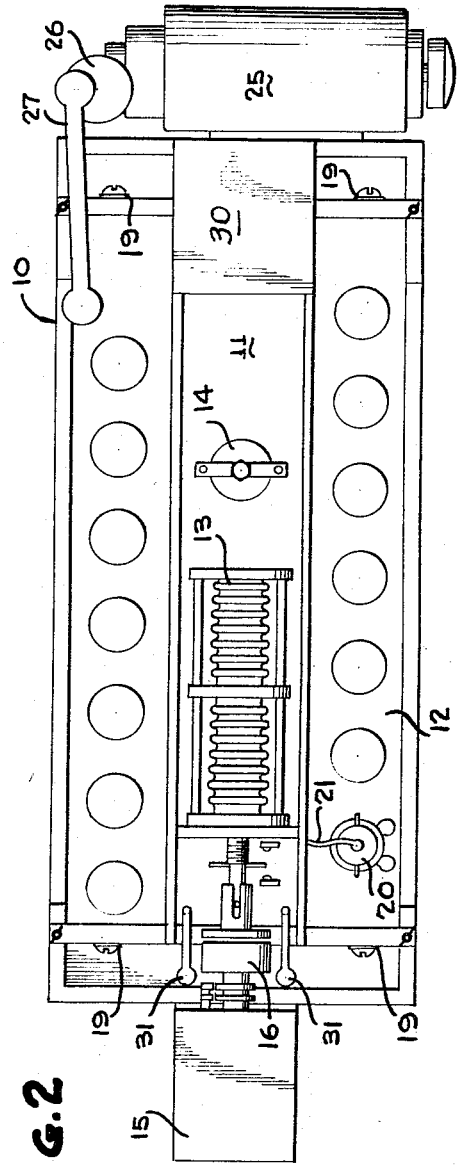

June 6, 1967  R. SCOTT  3,323,872
APPARATUS FOR THE STUDY OF REACTIONS INVOLVING THE ABSORPTION
OR EVOLUTION OF GASES
Filed March 22, 1963  3 Sheets-Sheet 2
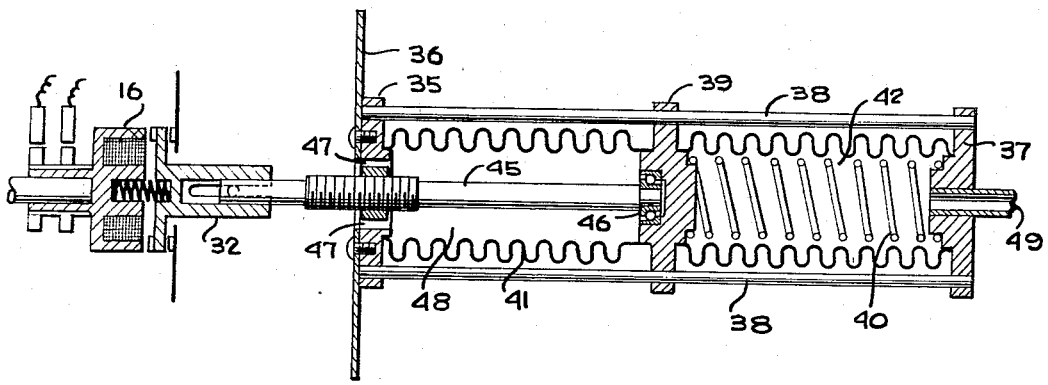
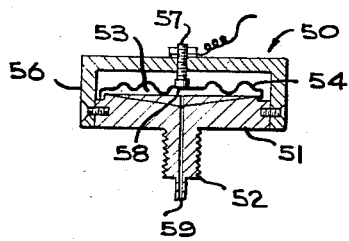
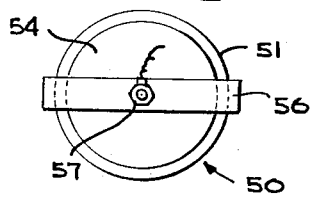
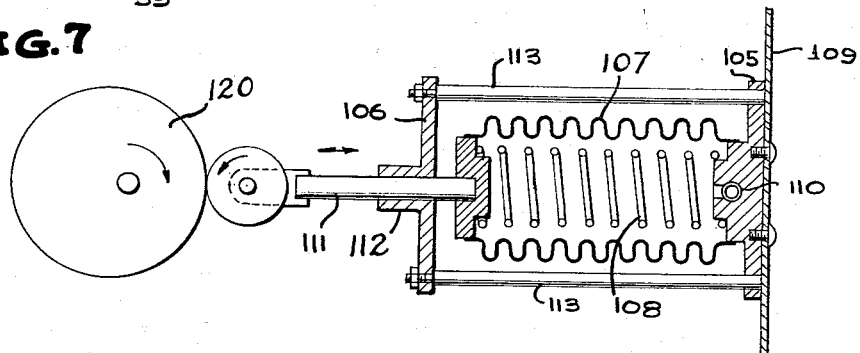
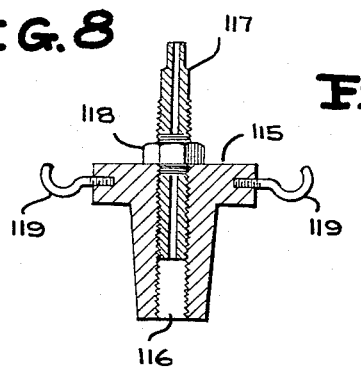
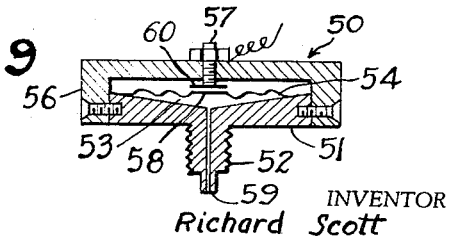
INVENTOR
Richard Scott
BY Stevens, Davis, Miller & Mosher
ATTORNEYS June 6, 1967  R. SCOTT  3,323,872
APPARATUS FOR THE STUDY OF REACTIONS INVOLVING THE ABSORPTION
OR EVOLUTION OF GASES
Filed March 22, 1963  3 Sheets-Sheet 3

INVENTOR
Richard Scott
By Stevens, Davis,
Miller & Mosher
ATTORNEYS

United States Patent Office 3,323,872
Patented June 6, 1967

3,323,872
APPARATUS FOR THE STUDY OF REACTIONS INVOLVING THE ABSORPTION OR EVOLUTION OF GASES
Richard Scott, Edinburgh, Scotland, assignor to Geigy Chemical Corporation, Greenburgh, N.Y., a corporation of Delaware
Filed Mar. 22, 1963, Ser. No. 267,234
Claims priority, application Great Britain, Mar. 22, 1962, 10,949/62
22 Claims. (Cl. 23—255)

This invention relates to improvements in apparatus for the study of reactions involving the absorption or evolution of gases.

The standard apparatus for biological and research work of this nature is the Warburg apparatus in which the gas evolution or absorption is measured as a pressure change to be read on a manometer attached to the flask in which the reaction is carried out.

The measurements are made at constant volume, i.e. as the gas pressure in the reaction flask which is sealed at the start of the reaction changes, adjustments are made to the manometer fluid so that the fluid in the limb attached to the flask is returned to a reference point. The difference in levels between the fluid in this limb and the limb open to the atmosphere is the increase or decrease in pressure due to the reaction in the flask. The pressure change under these conditions can readily be converted by means of a factor, called the "flask constant," into a volume representing the volume of gas evolved or absorbed in the reaction.

Though simple in theory the standard Warburg apparatus as described above has several disadvantages. To ensure equilibrium of the gas and reacting liquid present in the reaction flask it is essential to shake the flask throughout an experiment. As there may be a dozen or more reaction flasks the provision of the shaking facilities is an intricate mechanical problem and, moreover, breakages are common. Also, the flasks have to be maintained at constant temperature and allowances have to be made for changes in barometric pressure. To this end, readings have to be taken on a manometer attached to an empty flask of volume comparable with that of the reaction flasks and all the readings on the manometers connected to the reaction flasks compensated for any changes. This auxiliary flask and manometer is called a "thermobarometer."

The object of the present invention is to obviate or mitigate the aforementioned disadvantages.

The present invention is apparatus for the study of reactions involving the absorption or evolution of gases and comprising a manifold mounting or adapted to mount a plurality of diaphragm units each of which includes electrical signalling means, a plurality of reaction flasks each connected with a diaphragm unit, a pressure control device connected with the manifold to act upon the diaphragm units, means drivingly connected with the pressure control device and electronic apparatus connected with the driving means and the electrical signalling means to measure the change in pressure necessary to actuate the electrical signalling means on the diaphragm.

Embodiments of the present invention will now be described, by way of example, with reference to the accompanying drawings, in which, FIGS. 1 and 2 are respectively an elevation and a plan view of apparatus according to the invention;
FIG. 3 is a sectional plan view of a pressure control device use in the apparatus shown in FIG. 1;
FIGS. 4 and 5 are respectively a sectional elevation and a plan view of a diaphragm unit;

FIG. 6 is a block diagram of the electronic control circuit for the apparatus shown in FIG. 1;
FIG. 7 is a sectional plan view of an alternative pressure control device; and
FIG. 8 is a sectional elevation of an adjustable stopper for a reaction flask;
FIG. 9 is a sectional view of an alternate diaphragm unit.

Referring now to FIGS. 1 and 2, apparatus for the study of reactions involving the absorption or evolution of gases comprises a thermostatic tank 10 having an upper section 11 and a lower section 12 which preferably has a transparent bottom. In the upper section 11 of the tank are contained a pressure control device 13 and a volume adjuster 14, the device 13 being driven by a synchronous electric motor 15 mounted externally of the tank 10 through a magnetic clutch 16. The bottom of the upper section 11 is formed by a manifold 17 in which are mounted diaphragm units which will be described hereinafter. The diaphragm units may alternatively be integral with the manifold 17. A frame 18 is suspended by leaf springs 19 from the manifold 17 to occupy the lower section 12 of the tank 10, and reaction flasks 20 are mounted on the frame 18 by clips or other suitable means. The walls of the lower section 12 may be cut away to provide access to the flasks 20. The manifold 17 together with the frame 18 and springs 19 form a support for the diaphragm units and the reaction flasks 20, each unit being connected to a flask 20 by a length of flexible tubing 21. A shaker mechanism comprises a variable speed electric motor 25, a wheel 26 driven by the motor 25 and connecting rods 27 and 28, the former rod being eccentrically connected to the wheel 26 and the latter rod being secured to the frame 18.

The shaker mechanism can thus agitate the frame 18 and the flasks 20, the frequency of agitation being controllable by the electric motor 25 and the amplitude of agitation being variable by varying the eccentricity of connection between the wheel 26 and the rod 27. Electronic circuit means also form part of the apparatus as will be described hereinafter.

Thermostatting fluid is transferred to the upper section 11 by means of a pump 30 and returns under gravity to the lower section 12 via a constant head device 31. The operation of a heater (not shown) in the fluid circuit is controlled by thermosensitive element (not shown).

The pressure control device 13 is shown in detail in FIG. 3 and comprises a first end member 35 secured to the wall 36 of the tank 10, a second end member 37 supported by guide rods 38 on the first end member 35, a central member 39 slidable on the guide rods 38, a compression spring 40 mounted between the second end member 37 and the central member 39 to bias the latter towards the first end member 35, bellows material 41 extending between the second end member 37 and the central member 39 to define a main bellows space 42 and between the central member 39 and the first end member 35. A threaded shaft 45, driven by the motor 15 through the clutch 16 and a pin and slot device 32 passes into the pressure control device 13 through a tapped hole in the first end member 35 and drives the central member 39 through a thrust race 46. Breathing holes 47 are provided in the member 35 to ensure barometric pressure in the space 48 between the first end member 35 and the central member 39. A pipe outlet 49 is provided in the second end member 37 and is connected to the interior of the manifold 17.

The volume adjusting device 14 shown in FIG. 2 consists of a manually operated screw compressing a bellows which communicates with the manifold 17. This permits the total volume of the manifold to be varied for a purpose that will become apparent hereinafter.

A diaphragm unit 50 that may be mounted in the manifold 17 is shown in FIGS. 4 and 5. The unit 50 has a disc shaped body 51 and a threaded stem 52 (seen also in FIG. 1) projects from one end surface. The other end surface is formed with a concave cavity 53 and a corrugated diaphragm 54 is secured over the cavity 53 to define an air space. An arch 56 made of an electrically insulating material extends diametrically across the diaphragm 54 and an adjustable contact 57 is provided at the centre of the arch 56 to cooperate with a contact 58 on the diaphragm 54. The contacts 57 and 58 act as electrical signalling means. An alternate embodiment is shown in FIG. 9 wherein plate 60 is attached to contact 57 and a portion of the diaphragm 54 forms a plate 58 with the two plates forming a capacitor. The movement of the diaphragm will vary the spacing between the plates and thus vary the capacitance to give an electrical signal indicating the pressure differential. The unit 50 is secured to the manifold 17 by means of the stem 52 so that the pressure in the manifold 17 acts on the exterior surface of the diaphragm 54. The length of flexible tubing 21, seen in FIGS. 1 and 2 connects a bore 59 in the stem 52 to the reaction flask 20 adjacent the unit 50.

The diaphragm units 50 may be made integral with the manifold 17 rather than be formed separately and secured to the manifold.

The principle of pressure determination using the apparatus of the invention is as follows. By switching on the motor 15 in one or other direction it is possible to increase or decrease the pressure in the manifold 17. A particular diaphragm unit 50 having been selected, the motor 15 can be driven in such a direction that the contacts 57 and 58 are just made or broken at which point the flask 20 associated with the selected unit 50 and the diaphragm 54 are at the reference or constant volume condition. The making or breaking of the diaphragm contacts 57 and 58 causes the motor 15 to stop as will be explained hereinafter. If now a reference thermobarometer, i.e. a flask and diaphragm unit combination used only for reference purposes, is selected and the motor restarted in the reverse direction it can be made to run until the thermobarometer contacts are just made or broken. If due allowance is made for any initial difference in pressure necessary to bring the diaphragms connected to the selected unit 50 and to the reference thermobarometer into the constant volume condition, the time traverse of the pressure control device 13 driven by the motor 15 to cause the changeover of the contacts 57 and 58 of the selected unit 50 and of the thermobarometer is proportional to a high degree of accuracy to the difference in pressure between the flask and the reference thermobarometer. It is only necessary to time or otherwise measure the traverse of the bellows to have an accurate measure of the flask pressure with respect to the thermobarometer.

The provision of a reference point by means of the thermobarometer compensates for changes in temperature and atmospheric pressure because the reaction flasks and the thermobarometers are equally affected and so the difference in their pressures is unaffected.

The temperature of the air enclosed by the pressure control device 13 is not critical provided the latter is at the same temperature as the reaction flasks and these, together with the thermobarometers are closed. If the reaction flasks and thermobarometers are open and the temperature of the pressure control device is changed, the motor operating range changes to maintain the working pressure range in the manifold. This drift slightly modifies the relationship between the distance travelled by the central member 39 and the corresponding pressure change, i.e. the calibration of the system, and therefore is eliminated by thermostatting the manifold and the pressure control device.

The volume adjuster 14 similarly affects the volume-pressure relationship in the manifold and is used for calibration purposes.

The electronic apparatus connected with the motor 15 and the diaphragm units 50 to measure the change in pressure necessary to cause operation of the contacts on the diaphragm units is shown in FIG. 6 and operates as follows:

Pulses at twice mains frequency, from, for example, a single phase full wave rectifier, are applied to a counting tube 65. For 50 c./s. mains the tube 65 is a ten position tube and for 60 c./s. mains a twelve position tube. Every tenth (or twelfth) pulse is supplied to a decade tube 66 from which every tenth pulse operates a twelve position counting tube 67. The pulses thus arrive at the tube 67 at 1 second intervals.

Outputs from the tube 67 are taken twice per revolution of the discharge, i.e. at six second intervals and passed to the switch 68. In the position shown in FIG. 6, the timing position, the switch passes the pulses from the tube 67 to the decade tubes 69, 70, 71 and 72 which are connected in cascade, and which indicate respectively tenths, units, tens and hundreds of minutes respectively.

Intermediate output pulses are also taken from the tube 67. The first of these injects a pulse into a sensing trigger tube 73 and a motor "go" trigger tube 74, which on firing operates a motor relay 75 which connects the mains supply to the motor 15 and magnetic clutch 16 thus transmitting the motor drive to the pressure control device 13. The sensing trigger tube 73 may or may not be fired depending on the state of the Schmitt trigger circuit 64 which in turn depends on whether the selected diaphragm contacts are open or closed.

If the selected diaphragm contacts are already closed, sensing trigger tube 73 will fire on receipt of the first pulse from the tube 67, operating the relay 77 and causing the motor 15 to turn its shaft 45 clockwise and thus increase the pressure in the manifold. At some point the increase in pressure causes the selected diaphragm contacts to break. The trigger circuit 64 now changes over and transmits a pulse to a motor stop trigger tube 78. The tube 78 ignites, extinguishes the tube 74 and releases the motor relay 75.

The motor relay 75 also controls the operation of contacts 79 which close a circuit from the input (twice mains frequency) through a multiplying network 80 and switch 81 to supply pulses at eight times mains frequency to a cascade of four decade counting tubes 82, 83, 84 and 85. The register formed by the tubes 82 to 85 counts the mains frequency multiple for the period during which the motor relay 75 is operated and hence displays a count proportional to the pressure change in the manifold necessary to break the selected diaphragm contacts.

If a thermobarometer diaphragm contact has been selected a further pulse from the counting tube 67 operates a reset relay 86 which resets the counting sequence 82, 83, 84 and 85, and sensing trigger tube 73. Relay 86 steps diaphragm selector switch 76 by one position. A diaphragm unit connected to a reaction flask is now selected. The associated contacts on this diaphragm will be presumed open. The Schmitt trigger circuit 64 will be consequently in the opposite state from previously and when counting tube 67 injects a pulse into the motor "go" trigger tube 74 and sensing tube 73 the former will fire but the latter will not fire. The change-over contact on sensing relay 77 remains in a position which causes the motor 15 to turn its shaft anticlockwise thus reducing the pressure in the manifold. The motor relay 75 as before will supply power to the motor 15, operate the magnetic clutch 16 and cause the pulses of the selected multiple of mains frequency to be counted on the register formed by tubes 82 to 85.

The pressure change in the manifold will cause the selected reaction flask diaphragm contacts to "make," the trigger circuit 64 will change its state sending a pulse to the motor "stop" trigger tube 78. A pulse from the tube 78 extinguishes the tube 74 releasing the motor relay 75. The clutch 16 will be de-actuated and the motor 15 switched off.

While the motor relay 75 was operated, the register consisting of tubes 82, 83, 84 and 85 will be counting pulses at the multiple of mains frequency employed. The count displayed will be proportioned to the difference in pressure required to bring the thermobarometer and selected reaction flask diaphragms into the reference state.

An "initiate print out" signal is received from counting tube 67. This causes power to be supplied to four read-out uniselectors 90, 91, 92 and 93 which are respectively coupled with the decade tubes 69 and 82, 70 and 83, 71 and 84 and 72 and 85. These take up positions initially determined by the counts displayed on the timing register formed by tubes 69, 70, 71 and 72 and select the appropriate solenoids on the calculating machine. A print out oscillator 94 synchronised by a signal from the counting tube 65 steps the print out uniselector 95 which causes indexing digits corresponding to the position of diaphragm selector switch 76 to be printed out on printing calculating machine 96. Continued stepping of print out uniselector 95 by print out oscillator 94 reads in the time digits stored in uniselectors 90 to 93. The print out uniselector 95 now operates a changeover relay. The positions of the uniselectors 90 to 93 are now determined by the display of digits on counting tubes 82 to 85 and appropriate solenoids are selected on the printing calculating machine 96. Starting digits selected by the diaphragm selector 76 and provided to compensate for the different charateristics of different diaphragms are read into the printing calculating machine 96 and printed out followed by the digits corresponding to the display on tubes 82 to 85. The printing calculating machine 96 is programmed to calculate the difference between the starting counts and subsequently determined counts. Normally the difference corresponds to a pressure.

To calculate and read volumes directly, switches 68 and 81 which are ganged are initially set to the position marked "calibrate variable frequency oscillator." The register comprising tubes 69 to 72 hitherto used for timing the experimental run now counts pulses from a variable frequency oscillator 97 while the count register comprising tubes 82 to 85 counts the multiple of mains frequency previously used for causing the count decades to read pressure. The variable frequency oscillator 97 can now be adjusted so that the ratio of the counts displayed on decades 69 to 72 to those displayed on register 82 to 85 is numerically equal to a common flask constant. On rotating switches 68 and 81 so that the former again times the experiment and the latter is in the "read volume" position, the machine prints out digits corresponding to the volumes of gas absorbed or evolved in the reaction flasks during an experiment.

A common flask constant may be achieved by using flask stoppers as illustrated in FIG. 8 of the drawings. The stopper 115 is provided with a central tapped bore 116 in which is provided an externally threaded pipe 117. When the stopper is in position in a flask the pipe 117 may be adjusted in the bore 116 to vary the effective flask volume and equate the flask constant to a value common to all the reaction flasks. A lock nut 118 is provided to secure the pipe 117 in the desired position and to prevent it being moved as the flexible tube is attached. Hooks 119 may be provided to allow the flask to be secured to the frame 18.

A modified pressure varying device is shown in FIG. 7 of the accompanying drawing. The device consists of two end members 105 and 106 interconnected by a bellows 107 and a spring 108. The device may be secured to the bottom 109 of one section of the tank 10 and an outlet 110 is provided for connection to the manifold 17. The end member 106 is reciprocated by means of a plunger 111 which engages a cam 120 driven by the motor 15. The plunger 111 is supported in a bearing 112 supported on rods 113 from the end member 105.

Energisation of the motor 15 thus causes a cyclic pressure variation in the manifold and the electronic circuit of FIG. 6 may be modified to measure the time between the making or breaking of the thermobarometer and selected diaphragm contacts.

The diaphragm units may be modified to alter the value of a capacitor rather than to make or break contacts and by including the capacitor in a tuned circuit recognisable signals may be transmitted to the control circuit.

The diaphragm unit may also be provided with a second, normally closed, outlet by means of which the unit may be periodically flushed out by, for example, an inert gas.

I claim:
1. An apparatus for the study of reactions involving the absorption or evolution of gases comprising an enclosed manifold mounting a plurality of diaphragm units each of which includes electrical signalling means, a plurality of reaction flasks each connected to a diaphragm unit with one of said reaction flasks and its associated diaphragm unit acting as a standard, said electrical signalling means being actuated in response to a pre-determined pressure relationship between pressure in said manifold and pressure in its associated reaction flask, a pressure control device connected to said manifold, means for thermostatically controlling said manifold, said diaphragm units, said reaction flasks and said pressure control device, said pressure control device providing means to vary the pressure acting on the manifold side of the diaphragms of the diaphragm units in a regulated manner until actuation of the electrical signalling means of any given diaphragm unit associated with a reaction flask in which the pressure is unknown due to a reaction occurring in the flask and to vary the pressure in the manifold in said regulated manner until actuation of the signalling means of the diaphragm unit associated with the reaction flask acting as a standard, and measuring means operative responsive to actuation of said signalling means to measure the pressure change in the manifold between the actuation of said signalling means of any given diaphragm unit associated with the reaction flask in which the pressure is unknown due to reaction occurring in the flask and the actuation of the signalling means of the reaction flask acting as a standard in order to derive the difference between the unknown pressure in said reaction flask and the pressure in the reaction flask acting as a standard.

2. An apparatus as claimed in claim 1 wherein said measuring means includes calculating means for deriving the change in volume in said reaction flask in which the pressure is unknown.

3. An apparatus as defined in claim 1 wherein said measuring means includes timing means for measuring the time traverse of the pressure control device between the actuation of said signalling means of the diaphragm unit associated with the reaction flask in which the pressure is unknown due to a reaction occurring in the flask and the actuation of said signalling means of the diaphragm unit associated with the reaction flask acting as a standard.

4. An apparatus as defined in claim 1 in which the reaction flasks are provided with means for volume equalization.

5. An apparatus as defined in claim 1 in which the means for equalization is an adjustable plunger.

6. An apparatus as defined in claim 1 including driving means connected to said pressure control device for driving said pressure control device at a constant speed.

7. An apparatus as defined in claim 6 including means for automatically selecting any one of said reaction flasks and its associated diaphragm unit as well as the reaction flask and associated diaphragm unit acting as a standard.

8. An apparatus as defined in claim 7 including sensing means for indicating the direction in which to operate said driving means in order to actuate the signalling means of a selected reaction flask, and control means responsive to said sensing means for operating said driving means in said indicated direction.

9. An apparatus as defined in claim 1 in which the manifold and the reaction flasks are in contact with a thermostatically controlled fluid.

10. An apparatus as defined in claim 9 in which the pressure control device is also in contact with said thermostatically controlled fluid.

11. An apparatus as defined in claim 1 in which the volume of the manifold may be varied by means of an adjusting device communicating therewith.

12. An apparatus as defined in claim 11 in which the volume adjusting device is in contact with said thermostatically controlled fluid.

13. An apparatus as defined in claim 11 in which the volume adjusting device comprises a bellows compressible by a manually operated screw.

14. An apparatus as defined in claim 1 in which the reaction flasks are mounted on a frame suspended from the manifold by resilient means.

15. An apparatus as defined in claim 14 in which the frame and the flasks are connected with a shaker mechanism.

16. An apparatus as defined in claim 1 in which each diaphragm unit is a body defining a cavity, a diaphragm extending over the cavity, a bore communicating with the cavity and the exterior of the body, and said electrical signalling means is mounted between the body and the diaphragm.

17. An apparatus as defined in claim 15 in which the electrical signalling means comprises a pair of contacts, one of said contacts being on said diaphragm and the other said contact being on said body.

18. An apparatus as defined in claim 17 in which the electrical signalling means comprises a capacitor connected in a tuned circuit.

19. An apparatus as defined in claim 1 in which the pressure control device comprises a bellows.

20. An apparatus as defined in claim 19 in which the bellows is driven by means of a threaded shaft engaging a tapped hole.

21. An apparatus as defined in claim 19 in which the bellows is driven by means of a shaft and cam.

22. An apparatus as defined in claim 19 in which the pressure control device is driven by a synchronous electric motor.

References Cited

UNITED STATES PATENTS

| 1,874,339 | 8/1932 | Norton | 23—230 |
| 2,488,812 | 11/1949 | Galstaun et al. | 23—254 |

FOREIGN PATENTS 849,191  9/1952  Germany.

OTHER REFERENCES

Burk et al.: Microanalysis of Gases in Relation to Organic and Physiological Chemistry, Industrial and Engineering Chemistry, Anal. Ed., vol. 4, No. 1, pp. 3–7 (Jan. 15, 1932).

Souter et al.: Monometric Method for Study of Solid-Gas Reactions at Moderate Temperatures, Analytical Chemistry, vol. 26, No. 3, pp. 484–487 (March 1954).

MORRIS O. WOLK, *Primary Examiner.*

J. SCOVRONEK, *Assistant Examiner.*